(12) United States Patent
Tiso et al.

(10) Patent No.: US 6,931,121 B1
(45) Date of Patent: Aug. 16, 2005

(54) DUAL PERSONALITY ANALOG PORT

(75) Inventors: William J. Tiso, Sparta, NJ (US);
William E. Jacobs, Satellite Beach, FL (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/362,425

(22) Filed: Jul. 28, 1999

(51) Int. Cl.[7] .......................... H04M 1/00; H04M 9/00; H04M 9/08
(52) U.S. Cl. .......................... 379/399.01; 379/399.02; 379/413.02
(58) Field of Search .......................... 379/27.01, 27.05, 379/27.06, 29.01, 29.03–29.04, 399.01, 401, 379/412, 413.02

(56) References Cited

U.S. PATENT DOCUMENTS

| | | | |
|---|---|---|---|
| 5,892,823 A | * | 4/1999 | Stelman |
| 6,118,763 A | * | 9/2000 | Trumbull .................... 370/231 |
| 6,272,209 B1 | * | 8/2001 | Bridger et al. |

* cited by examiner

Primary Examiner—Duc Nguyen
(74) Attorney, Agent, or Firm—Blakely, Sokoloff, Taylor & Zafman LLP

(57) ABSTRACT

An RJ 11 port is disclosed that detects the device to which it is connected and automatically reconfigures itself as end user equipment or network interface equipment.

18 Claims, 2 Drawing Sheets

DUAL PERSONALITY ANALOG PORT

TECHNICAL FIELD

This invention relates to telephony interface equipment, and more particularly, to an improved interface connector that is software configurable.

BACKGROUND OF THE INVENTION

A prevalent type of physical interface to a telephony system is an RJ 11 port. The RJ 11 port is the common opening into which an RJ11 connector from a telephone is input. Many devices used in the telephony industry include numerous RJ11 ports and connectors.

The RJ 11 ports and connectors are utilized both to connect to the telephony systems and to connect to telephony end user equipment. As a simple example, consider a fax machine that has an additional port to which a telephone may be connected. The fax machine will typically include two RJ 11 ports, one for connecting the fax to the telephone network, and one for connecting a telephone to the fax machine if desired. In more complex equipment, there may be a large number of RJ 11 ports for connecting to end user equipment, and a large number of ports for connecting to the telephone network.

Depending upon the configuration and requirements of any particular system, it is possible that all of the RJ 11 ports for connecting to the telephone network are used up, while there are available RJ 11 connectors for connection to end user equipment. Additionally, it is possible, in consumer equipment such as personal computers, that the end user simply plugs the wrong wires into the RJ ports, connecting an end user equipment to the port that is supposed to be connected with the telephone network.

In view of the foregoing, there exists a need in the art for a more flexible and error free technique of utilizing RJ 11 ports in telephony system equipment.

SUMMARY OF THE INVENTION

The above and other problems of the prior art are overcome in accordance with the present invention which relates to an improved technique of facilitating use of an RJ 11 port. The inventive method and apparatus provides an RJ 11 port which is software configurable to accept connection to either an end user telephone equipment or to a telephone network. In a preferred embodiment, the software may automatically detect whether the port is connected to a telephone network or to an end user equipment. The software then configures itself such that the RJ 11 port acts either as a port for connection to the telephone network, or as a port for connection to an end user equipment.

DETAILED DESCRIPTION OF THE PREFERRED EMBODIMENT

Figure 1:
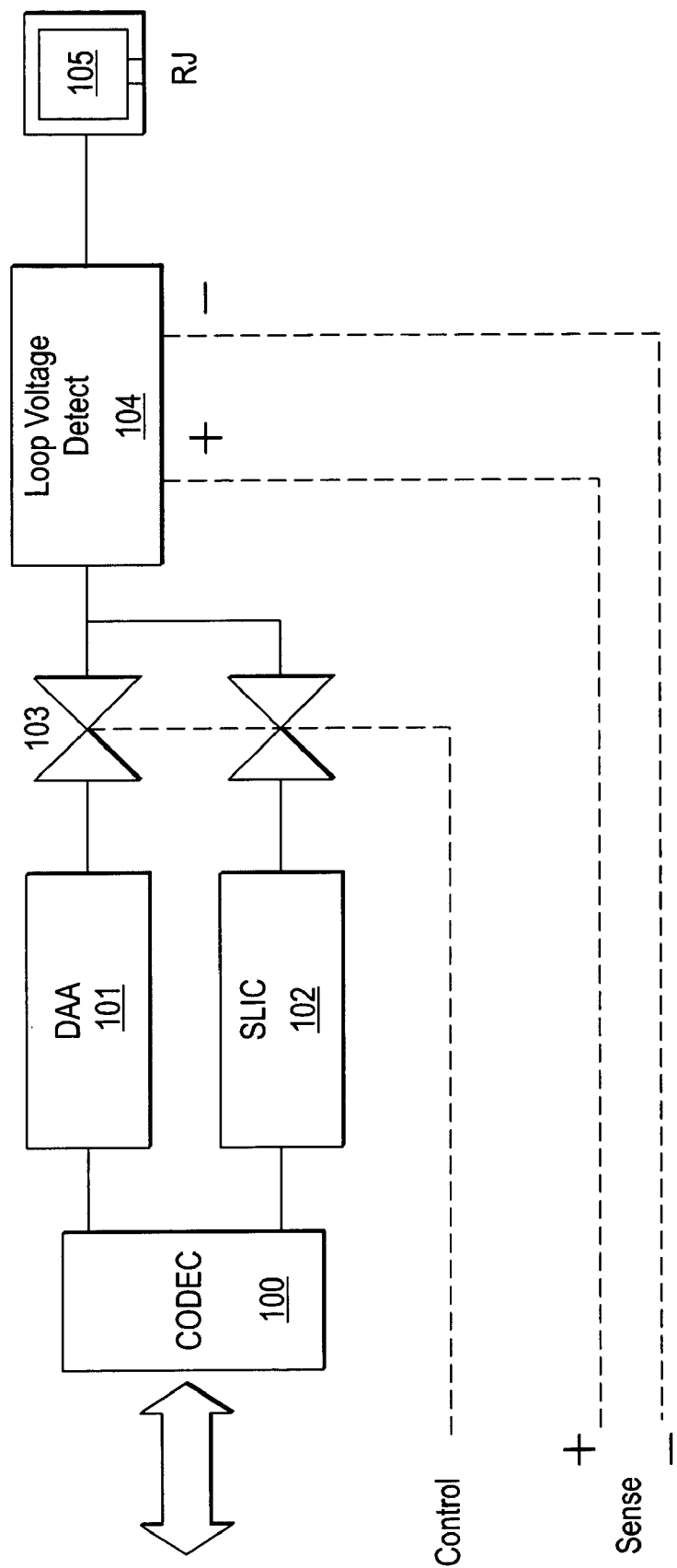

FIG. 1 is a block diagram of the necessary hardware to implement an exemplary embodiment of the present invention. The arrangement of FIG. 1 includes and exemplary Codec 100, available off the shelf, connected to a DAA and SLIC interface 101 and 102 respectively. State machine controlled switches 103 operate in response to a state machine (not shown in FIG. 1) in order to configure the device as either a port for connection to an end user telephony equipment ("end user port") or a port for connection to the telephone network ("network port"). Also shown in FIG. 1 is the RJ 11 port itself, indicated at 105.

Figure 2:
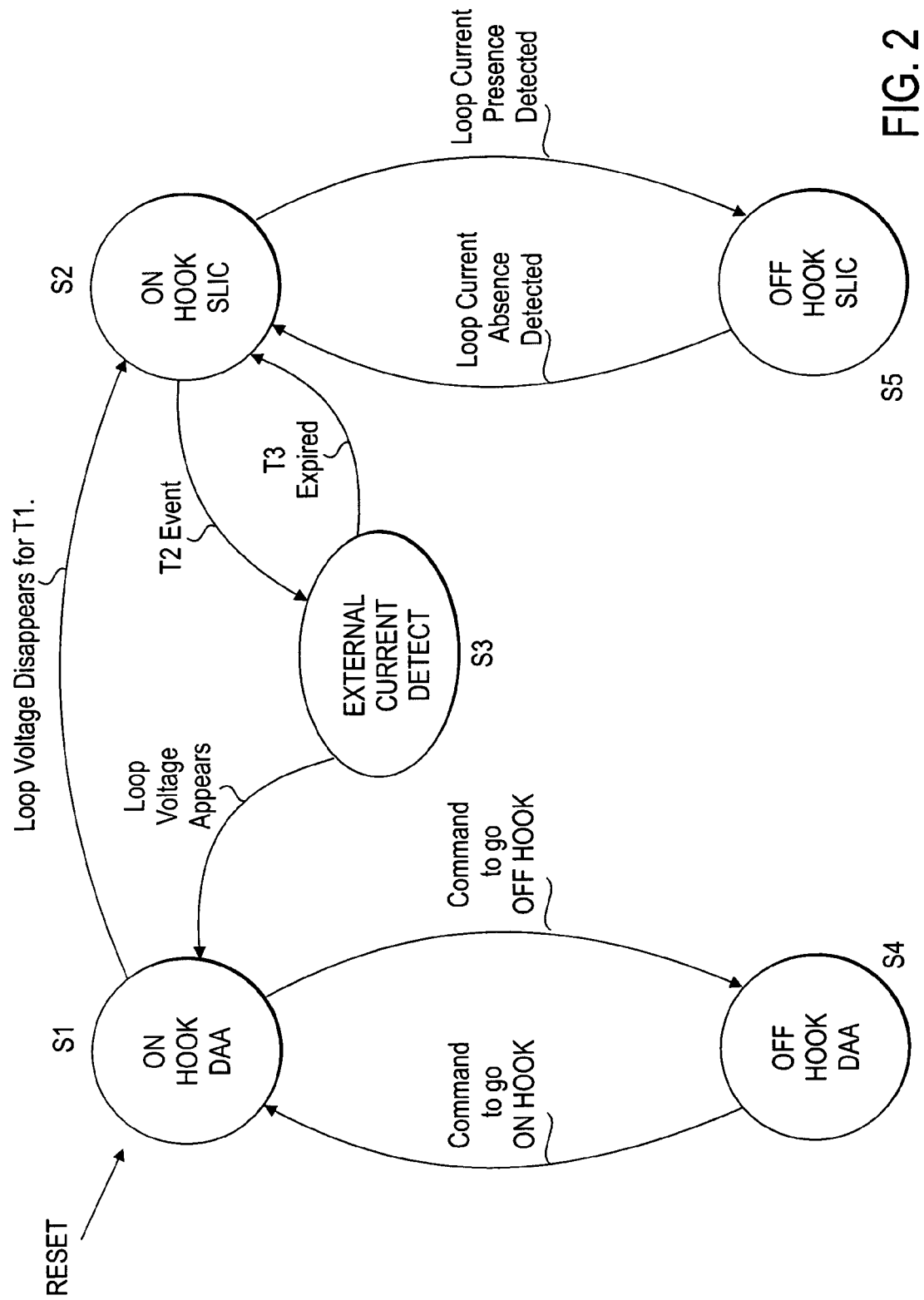

Referring to FIG. 2, the preferred state is the on hook DAA state. In this state, the outside line at the RJ (105) is connected only to the voltage detercti on circuit 104.

While connected to a pbx or pstn, there should be loop voltage constantly present. If this voltage disappears for time T1 (e.g. 5 seconds) then it can be assumed that the connection to the PBX or PSTN has been removed. This will trigger a transition to the On Hook SLIC state S2. In this state, the port is switched to the SLIC circuit, and as a result, constantly supplies loop voltage out of the RJ 105.

In state S2, the SLIC continuously monitors port for loop current, which indicates that the end user equipment has gone off hook. The resulting transition to the off hook SLIC state is shown for clarity, but is not critical the novel aspects of the present invention.

While in state S2, the system can determine if it is connected to a PBX or PSTN. If this occurs, then the system must be reconfigured so that the port 105 behaves like a DAA port. To facilitate this decision, an interval timer T2 is used to periodically isolate the loop voltage being supplied by the SLIC circuit from the loop voltage detector 104. The duration of this isolation is time T3, and exemplary value of which could be 50 ms. T3 must be long enough to detect external loop voltage but short enough to minimize the removal of loop voltage to a connected end user equipment. If external loop voltage is detected, a transition to state S1 occurs and the port is thereby reconfigured to that of a DAA.

It is also possible to configure the remainder of any circuit card to which the system is connected so that the RJ 11 port is connected to different components depending upon whether it is configured as a DAA or a SLIC. In a simple example, a board may have only one DAA port and one SLIC port at any time. Such an arrangement would exist with respect to a standard inexpensive modem for use with a personal computer. If the SLIC port is accidentally plugged into the PSTN, the board could automatically reconfigure that port and connect it to the electronics for receiving signals from the telephone line. Additionally, the system could also automatically reconfigure the remaining port to become the SLIC port. In this manner, a user end not worry about into which port he or she plugs the wire connecting the system to the PSTN.

While the above describes the preferred embodiment of the invention, various other modifications and enhancements will be apparent to those of skill in the art. Such enhancements are intended to be covered by the following claims.

What is claimed:

1. An apparatus for interfacing with a connector, comprising:
    an RJ-11 port to receive an RJ-11 connector from end user equipment or a telephone network;
    a detection circuit to automatically detect whether the RJ-11 port receives an RJ-11 connector from end user equipment or from a telephone network; and
    a control circuit to automatically configure the RJ-11 port to interface to the end user equipment in response to detecting that the port receives an RJ-11 connector from the end user equipment or to interface to the telephone network in response to detecting that the port receives an RJ-11 connector from the telephone network.

2. An apparatus according to claim 1, wherein the RJ-11 port comprises an RJ-11 port on a computer modem board, wherein the detection circuit detects that the RJ-11 connector is received from end user equipment, and wherein the control circuit configures the RJ-11 port as a subscriber line interface circuit (SLIC) port to interface to the end user equipment.

3. An apparatus according to claim 2, wherein the detection circuit detects that the RJ-11 connector is received from a telephone, and the control circuit configures the RJ-11 port as a SLIC port to interface to the telephone.

4. An apparatus according to claim 1, wherein the RJ-11 port comprises an RJ-11 port on a computer modem board, wherein the detection circuit detects that the RJ-11 connector is received from a telephone network, and wherein the control circuit configures the RJ-11 port as a DAA port to interface to the telephone network.

5. An apparatus according to claim 4, wherein the detection circuit detects that the RJ-11 connector is received from a private branch exchange (PBX), and the control circuit configures the RJ-11 port as a DAA port to interface to the PBX.

6. An apparatus according to claim 4, wherein the detection circuit detects that the RJ-11 connector is received from a public switched telephone network (PSTN), and the control circuit configures the RJ-11 port as a DAA port to interface to the PSTN.

7. An apparatus according to claim 1, wherein the RJ-11 port comprises an RJ-11 port on a fax machine, wherein the detection circuit detects that the RJ-11 connector is received from end user equipment, and wherein the control circuit configures the RJ-11 port as a SLIC port to interface to the end user equipment.

8. An apparatus according to claim 1, wherein the RJ-11 port comprises an RJ-11 port on a fax machine, wherein the detection circuit detects that the RJ-11 connector is received from a telephone network, and wherein the control circuit configures the RJ-11 port as a DAA port to interface to the telephone network.

9. An apparatus according to claim 1, wherein the detection circuit further comprises a loop voltage detector and an interval timer to isolate a loop voltage supplied by the loop voltage detector, wherein the control circuit configures the RJ-11 port as a SLIC port by default, and as a DAA port if an external loop voltage is detected.

10. A method for interfacing to a connector, comprising:
detecting whether an RJ-11 port engages with an RJ-11 connector from end user equipment or from a telephone network; and
automatically configuring the RJ-11 port to interface to the end user equipment in response to detecting that the port receives an RJ-11 connector from the end user equipment or to interface to the telephone network in response to detecting that the port receives an RJ-11 connector from the telephone network.

11. A method according to claim 10, wherein detecting whether the RJ-11 connector engaged with the RJ-11 port is a connector from end user equipment or a telephone network comprises detecting that an RJ-11 port on a computer modem board is connected to end user equipment, and wherein configuring the RJ-11 port comprises configuring the RJ-11 port as a subscriber line interface circuit (SLIC) port to interface to the end user equipment.

12. A method according to claim 11, wherein detecting that the RJ-11 port engages with the RJ-11 connector from end user equipment comprises detecting that the RJ-11 connector is connected to a telephone, and wherein configuring RJ-11 port comprises configuring the RJ-11 port as a SLIC port to interface to the telephone.

13. A method according to claim 10, wherein detecting whether the RJ-11 connector engaged with the RJ-11 port is a connector from end user equipment or a telephone network comprises detecting that an RJ-11 port on a computer modem board is connected to a telephone network, and wherein configuring the RJ-11 port comprises configuring the RJ-11 port as a DAA port to interface to the telephone network.

14. A method according to claim 13, wherein detecting that the RJ-11 connector engaged with the RJ-11 port is a connector from a telephone network comprises detecting that the RJ-11 connector is a connector from a private branch exchange (PBX), and wherein configuring the RJ-11 port comprises configuring the RJ-11 port as a DAA port to interface to the PBX.

15. A method according to claim 13, wherein detecting that the RJ-11 connector engaged with the RJ-11 port is a connector from a telephone network comprises detecting that the RJ-11 connector is a connector from a public switched telephone network (PSTN), and wherein configuring the RJ-11 port comprises configuring the RJ-11 port as a DAA port to interface to the PSTN.

16. A method according to claim 10, wherein detecting whether the RJ-11 connector engaged with the RJ-11 port is a connector from end user equipment or a telephone network comprises detecting that an RJ-11 port on a fax machine is connected to end user equipment, and wherein configuring the RJ-11 port comprises configuring the RJ-11 port as a subscriber line interface circuit (SLIC) port to interface to the end user equipment.

17. A method according to claim 10, wherein detecting whether the RJ-11 connector engaged with the RJ-11 port is a connector from end user equipment or a telephone network comprises detecting that an RJ-11 port on a fax machine is connected to a telephone network, and wherein configuring the RJ-11 port comprises configuring the RJ-11 port as a DAA port to interface to the telephone network.

18. A method according to claim 10, wherein detecting whether the RJ-11 connector engaged with the RJ-11 port is a connector from end user equipment or a telephone network further comprises detecting a loop voltage and isolating the loop voltage, wherein configuring the RJ-11 port comprises configuring the RJ-11 port as a SLIC port by default, and as a DAA port if an external loop voltage is detected.

* * * * *